Nov. 8, 1932.    C. S. NELSON    1,886,573
MOTOR VEHICLE CHASSIS
Filed Aug. 5, 1931    2 Sheets-Sheet 1
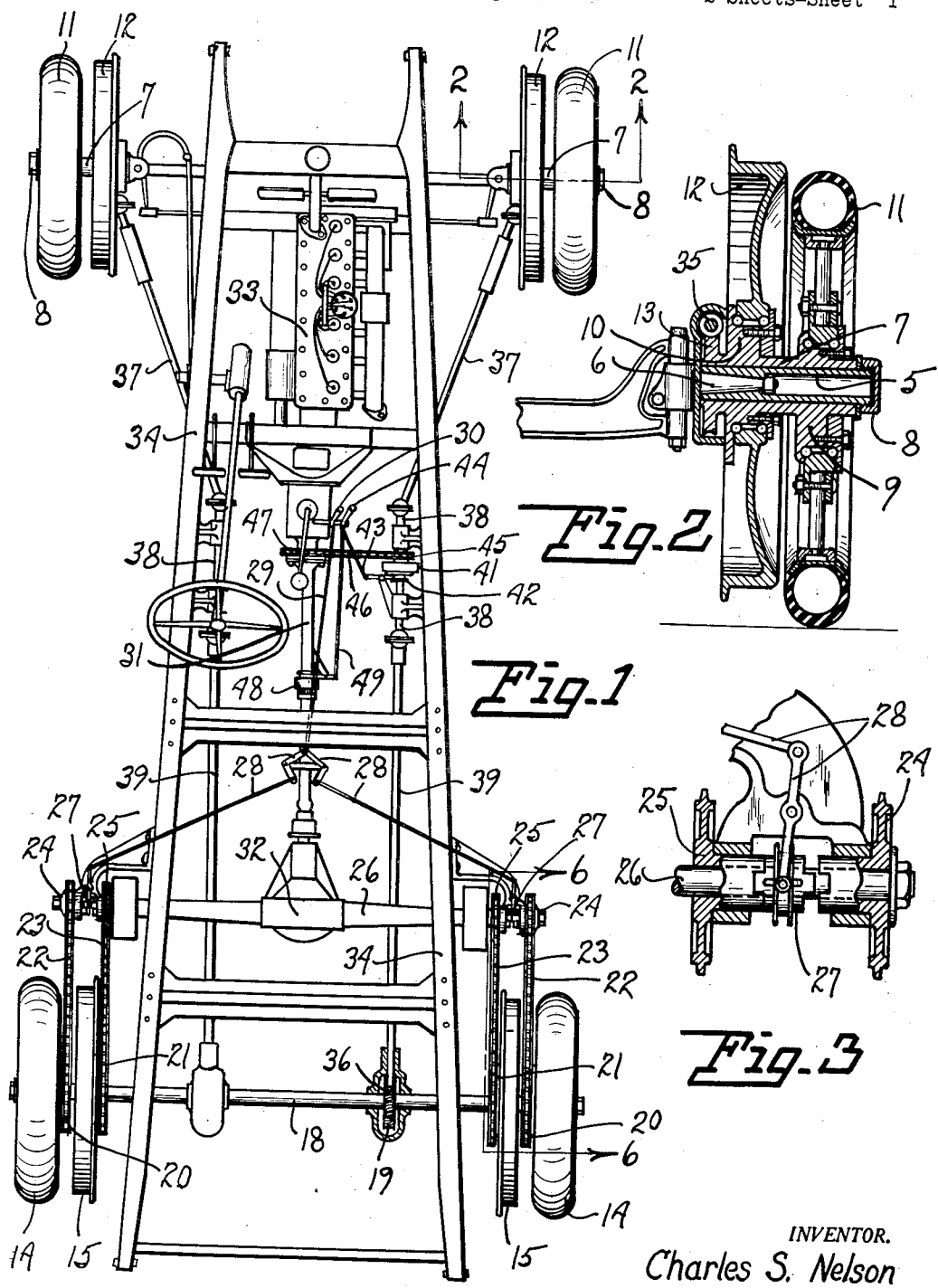
INVENTOR.
Charles S. Nelson
BY
Glenn L. Fish
ATTORNEY.

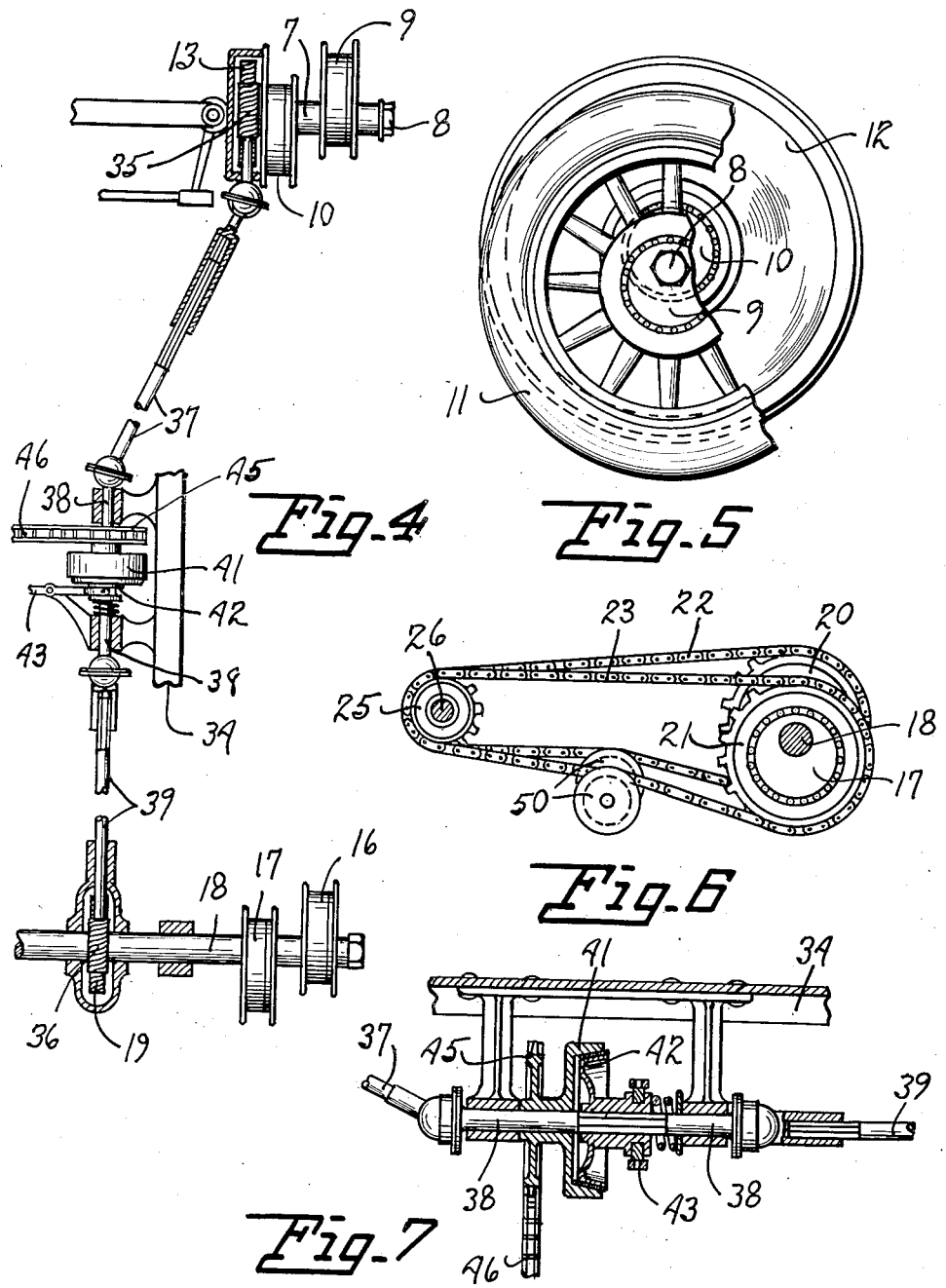

Patented Nov. 8, 1932

1,886,573

UNITED STATES PATENT OFFICE

CHARLES S. NELSON, OF SANDPOINT, IDAHO

MOTOR VEHICLE CHASSIS

Application filed August 5, 1931. Serial No. 555,163.

My invention relates to motor vehicle chassis and the primary objects of the invention are to provide a chassis having, in place of the four regular pneumatic tired wheels, four pairs of wheels, each pair comprising an eccentrically connected pneumatic tired wheel and a flange or track engaging wheel, and to provide means whereby each pair of wheels is caused to change its relative position with respect to the ground or other surface on which the vehicle is riding. In other words, assuming that the vehicle is riding over the ground on the four pneumatic wheels, I provide means whereby these said four pneumatic wheels are eccentrically and simultaneously lifted from engagement with the ground and at the same time the four flange or track engaging wheels are lowered whereby the vehicle may ride on a track. The advantages in reversing the two sets of wheels, namely the pneumatic wheels and the flange wheels, are that a motor vehicle or truck when equipped with this device may be used to leave a track on which it is riding and run on the pneumatic wheels to various localities in the vicinity for loads of merchandise and may then return to the track and run to the next destination on the track for delivery of the merchandise thus saving much time and labor that is caused by extra loading when separate vehicles are used for the track and for places located off from the track.

With the above and other objects in view which will appear as the description proceeds, the invention consists of the novel construction, adaptation, combination and arrangement of parts hereinafter described and claimed. These objects are accomplished by devices illustrated in the accompanying drawings; wherein:

Figure 1 is a top plan view of the vehicle chassis equipped with my devices;

Fig. 2 is a view in vertical section taken on a broken line 2, 2 of Fig. 1;

Fig. 3 is a view in vertical section showing the clutch for the drive sprockets;

Fig. 4 is a detail plan view, with parts broken away, and showing the mechanism for reversing the positions of the wheels;

Fig. 5 is a view in side elevation showing the arrangement of the associated track and ground engaging wheels;

Fig. 6 is a view in vertical section taken on a broken line 6, 6 of Fig. 1 and showing the drive sprockets and chains; and Fig. 7 is a view in longitudinal section showing the clutch for the wheel reversing mechanism.

Referring to the drawings throughout which like reference numerals designate like parts, a description of the mounting of the front wheels will first be made and only one pair of said wheels will be described as they are the same on both sides. Referring particularly to Fig. 2 of the drawings, a cylindrical sleeve 5 is fastened onto the ordinary stub axle or spindle 6. Said sleeve serves as an axle bearing for a hub member or casting designated as a whole by the numeral 7 and which member is retained on said sleeve or axle by a nut or cap 8. Said hub member has an outer integrally formed eccentric drum 9 and a corresponding inner drum 10 that is eccentrically disposed diametrically opposite the outer drum with respect to the sleeve or axle 5. The outer drum 9 has a pneumatic tired wheel 11 revolubly mounted thereon in any suitable manner, and the inner drum 10 has a flange track wheel 12 revolubly mounted thereon. The inner end of the hub member 7 is integrally provided with a gear 13 for reasons hereinafter set forth.

The rear tired wheels 14 and flange wheels 15 are respectively mounted on drums 16 and 17 formed or fixed on the outer end portions of a rear axle 18 as most clearly shown in Fig. 4. Said rear axle has gears 19 fixed thereon for reasons hereinafter described. Said rear wheels have sprockets 20 and 21 respectively fixed to their inner faces, and chains 22 and 23 respectively lead from said sprockets to small drive sprockets 24 and 25. Said drive sprockets are revolubly mounted on a rear driven shaft 26 in spaced apart relation and a clutch member 27, interposed therebetween and slidably mounted on said shaft to revolve therewith, is arranged to be alternately brought into mesh with the hub of either of said drive sprockets. Said clutches on either side of the vehicle are each connected by a series of corresponding levers and bell cranks 28 to a rod 29 which is connected to a hand lever 30. It will thus be apparent that said clutch may be simultaneously brought into mesh with both of the sprockets 24 or with both of the sprockets 25 by shifting said hand lever either backward or forward, as the case may be, thus rotating either the rear tire wheels 14 or the rear flange wheels 15 as desired. It will be understood that the driven shaft 26 is propelled by a drive shaft 31 connected therewith by means of a differential 32 and that said drive shaft is connected with the engine 33 of the vehicle chassis or frame 34 in the usual manner. Having described the propelling means for the chassis the means for alternatively bringing the tired wheels 11 and 14 and the flange wheels 12 and 15 in contact with the ground and with a track respectively will now be described.

The gears 13 formed on the hub members 7 each have a worm 35 in mesh therewith and the gears 19 on the rear axle 18 have a worm 36 in mesh therewith as most clearly shown in Figs. 1, 4 and 7 of the drawings. The worms 35 each have a shaft 37 connected by universal and slip sleeve joints to stub shafts 38 and the worms 36 have a shaft 39 also connected by universal and sleeve joints to stub shafts 38. On the right hand side of Fig. 1 a friction clutch has its female member 41 revolubly mounted on the stub shaft 38 and its male member 42 slidably mounted on the stub shaft 38 and arranged to turn therewith. A lever and rod arrangement 43 is adapted to throw said male member into and out of engagement with said female member by manipulation of a hand lever 44 connected to said lever means 43. Said female member has a sprocket 45 connected by a chain 46 to a sprocket 47 mounted on the drive shaft 31.

In the operation of the foregoing described means for shifting the tired wheels and the flange wheels it is simply necessary to throw the male clutch member 42 into engagement with its female member 41 for the short length of time that is necessary for reversing the positions of the tired wheels and the flange wheels. An auxiliary clutch 48 is positioned on the drive shaft 31 and is connected to the hand lever 44 by lever rods 49 and is arranged to disconnect said drive shaft by disengaging said clutch so that the rear wheels 14 and 15 will not turn while the means for shifting the positions of the pneumatic tire and flange wheels are operating as will be understood.

When the clutch members 41 and 42 are thrown into engagement by means of the hand lever 44 the shafts 37 and 39 will cause the worms 35 and 36 to turn the forward hub member 7 on the right hand side of the chassis and the rear axle 18 respectively. Said rear axle will, in its rotary movement, cause the shafts 39 and 37 on the left hand side of the chassis to turn the forward hub 7 on the left side of said chassis and the movement of all of said members will, of course, be simultaneous. Said clutch members are retained in engagement only for the short time that is necessary to reverse the position of the pneumatic and flange wheels. In order to permit the drums 16 and 17 to reverse their relative positions sufficient slack must be left in their chains 22 and 23 to allow for the eccentric movement of said drums. As shown in Fig. 6, this slack may be taken up by means of pulleys 50 or the like which may press against said chains, by any suitable and desirable means, when the chains are in their normally operative positions.

I claim:

1. A motor vehicle chassis having in combination a pair of hub members revolubly mounted on the forward stub axles of the chassis, said hubs each comprising a pair of eccentrically disposed drums, a rear axle, a pair of drums eccentrically disposed on the ends of the rear axle, a ground engaging and a track engaging wheel revolubly mounted on each of the four pairs of drums, means whereby either the ground engaging or the track engaging wheels on the rear axle are simultaneously rotated, and means whereby all the ground engaging wheels are raised from engagement with the ground while all the track engaging wheels are lowered to engagement with a track.

2. A motor vehicle chassis having in combination a pair of hub members adapted to be revolubly mounted on the forward stub axles of the chassis, said hub members comprising a pair of drums eccentrically disposed in diametrically opposite relation, a ground engaging wheel revolubly mounted on one of said drums and a track engaging wheel revolubly mounted on the other drum, a rear axle, a pair of drums eccentrically disposed in diametrical relation on the end portions of said rear axle, a ground engaging wheel revolubly mounted on one of said drums and a track engaging wheel revolubly mounted on the other wheel of each pair, a driven shaft, sprocket and chain means whereby said driven shaft is arranged to rotate the wheels on the rear axle, clutch means whereby either the ground engaging wheels or the track engaging wheels are simultaneously rotated, a drive shaft for propelling the driven shaft, a gear formed on each of the forward hub members, a pair of gears fixed in spaced relation on the rear axle, a system of shafts connectedly mounted on either side of the chassis, a worm on both ends of both shaft systems, the worms on the forward ends of said shafts in mesh with the gears on the forward hub members and the worms on the rear ends of said shafts in mesh with the gears on the rear axle, clutch means interposed in the shaft system on one side of the chassis, sprocket and chain means whereby the driving shaft is arranged to rotate said clutch means, lever means for shifting the clutch means whereby the clutch means imparts rotary movement to its system of shafts and whereby said shaft system imparts rotary movement to one of the forward hub members and to the rear axle, the rear axle adapted to impart rotary movement to the other shaft system thereby rotating the other forward hub member, and auxiliary clutch means whereby the driven and driving shafts are disconnected while the aforesaid shaft systems are in operation.

In testimony whereof I affix my signature.

CHARLES S. NELSON.